United States Patent
Reagan et al.

(10) Patent No.: US 8,390,443 B1
(45) Date of Patent: Mar. 5, 2013

(54) DETECTION SYSTEM

(75) Inventors: Robert Michael Reagan, San Jose, CA (US); Roger T. Haas, Scotts Valley, CA (US); Kim Blake Peterson, San Jose, CA (US); Simon Westbrook, Scotts Valley, CA (US)

(73) Assignee: Public Wireless, Inc., San Jose, CA (US)

( * ) Notice: Subject to any disclaimer, the term of this patent is extended or adjusted under 35 U.S.C. 154(b) by 696 days.

(21) Appl. No.: 12/574,682

(22) Filed: Oct. 6, 2009

Related U.S. Application Data

(62) Division of application No. 11/471,978, filed on Jun. 20, 2006, now Pat. No. 7,598,857.

(51) Int. Cl.
*G08B 1/08* (2006.01)

(52) U.S. Cl. .................... 340/539.22; 340/539.13

(58) Field of Classification Search ............ 340/539.22, 340/522, 521, 539.13, 539.26, 600, 601, 340/589

See application file for complete search history.

(56) References Cited

U.S. PATENT DOCUMENTS

| | | | |
|---|---|---|---|
| 3,914,692 A | 10/1975 | Seaborn, Jr. | |
| 6,084,510 A | 7/2000 | Lemelson et al. | |
| 6,608,559 B1 | 8/2003 | Lemelson et al. | |
| 6,958,688 B1 * | 10/2005 | Barnett | 340/506 |
| 7,049,952 B2 | 5/2006 | Kulesz et al. | |
| 7,248,159 B2 | 7/2007 | Smith | |
| 7,262,690 B2 | 8/2007 | Heaton et al. | |
| 7,598,857 B1 * | 10/2009 | Reagan et al. | 340/539.22 |
| 2003/0137415 A1 | 7/2003 | Thomson | |
| 2005/0197775 A1 | 9/2005 | Smith | |

* cited by examiner

*Primary Examiner* — John A Tweel, Jr.
(74) *Attorney, Agent, or Firm* — Procopio, Cory, Hargreaves & Savitch LLP

(57) ABSTRACT

Systems and methods for creating a detector network across one or more existing communications systems. In one implementation, a system is provided. The system includes a plurality of hosts, each host hosting one or more detectors operable to detect an occurrence of an event, the hosts including functionality that is not related to the detectors and including communication functionality. The system also includes a management device for managing the detectors and one or more communications networks linking the detectors and the management device using the communication functionality of the respective host.

17 Claims, 5 Drawing Sheets

DETECTION SYSTEM

CROSS-REFERENCE TO RELATED APPLICATIONS

This application is a divisional application of and claims priority to U.S. application Ser. No. 11/471,978, filed on Jun. 20, 2006.

BACKGROUND

The present disclosure relates to detection systems.

Conventional detectors provide identification and alert functionality in response to one or more different source events. The sensitivity and range of a particular detector can vary depending on the type of detector and the strength of the source event. For example, a radiation detector can identify the presence of a radiological event within a predefined sensitivity range. The radiation detector uses a measurement device, such as a Geiger counter, to detect radioactive particles that come into contact with the detector. Other types of detectors include biological detectors and chemical detectors. Biological and chemical detectors, for example, can sample air surrounding the detector at regular intervals for analysis (e.g., using mass spectroscopy).

Typically, conventional detectors operate as independent units, which can be automatic or user operated. For example, if a detector, such as a radiation detector, detects an event (e.g., a source which exceeds some predefined threshold amount), the detector can respond by triggering an alarm.

SUMMARY

Systems and methods are provided for creating a detector network across one or more existing communications systems. Existing infrastructure can be utilized to provide for detectors housed within existing or conventional devices. The detectors can be linked together with a central management device such that activity and operation of multiple detectors can be coordinated from a central location.

In general, in one aspect, a system is provided. The system includes a plurality of hosts, each host hosting one or more detectors operable to detect an occurrence of an event, the hosts including functionality that is not related to the detectors and including communication functionality. The system also includes a management device for managing the detectors and one or more communications networks linking the detectors and the management device using the communication functionality of the respective host.

Aspects of the system can include one or more of the following features. The one or more detectors can include a radiation detector. The one or more detectors can include a biological detector. The one or more detectors can include a chemical detector. The one or more detectors can include a biometric imaging detector. The one or more detectors can include a meteorological detector. The device can be an ATM machine. The device can be a pay telephone. The device can include video monitoring equipment. The management device can be operable to control the operation of each individual detector. The management device can be operable to provide instructions to a detector of the one or more detectors in response to a received alert.

In general, in another aspect, a method is provided. An alert from a first detector of a plurality of detectors is received. An alert from a second detector of the plurality of detectors is received. The alert type received from the second detector is compared with the alert type received from the first detector. If the alert type from the second detector is the same as the alert type from the first detector, the alerts are processed to determine a relationship between the alerts.

Aspects of the method can include one or more of the following features. The processing can further include determining the spatial relationship between the first and second detectors. The method can further include determining a direction of travel for a source event generating the alerts. The method can further include determining a rate of travel for the source event using the spatial location of the first and second detectors and an elapsed time between the alerts. The processing can further include providing instructions to the first and second detectors to provide video data associated with the time of the alert. The processing can further include providing instructions to one or more detectors of the plurality of detectors, the instructions including placing the one or more detectors in a heightened state.

In general, in another aspect, a method is provided. An identified target event is received at a detector management device. Instructions associated with the identified target event are transmitted to one or more host devices, where the host devices each include at least one detector. An alert is received from a detector corresponding to the identified target event. The received alert is processed. Processing the received alert can further include identifying the location of the target event.

Particular embodiments of the invention can be implemented to realize one or more of the following advantages. Detectors can be housed within existing device infrastructure in public locations. Consequently, detectors can be positioned unobtrusively or concealed. Additionally, using existing devices as hosts for the detectors can eliminate the need to establish connectivity (e.g., electrical, communications). The detectors can be networked into a detection system providing flexibility in operating the detectors from a centralized detector management device. Additionally, the networked detection system provides the ability to both passively track events passing by the detectors as well as to actively seek out target events according to instructions from the detector management device.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
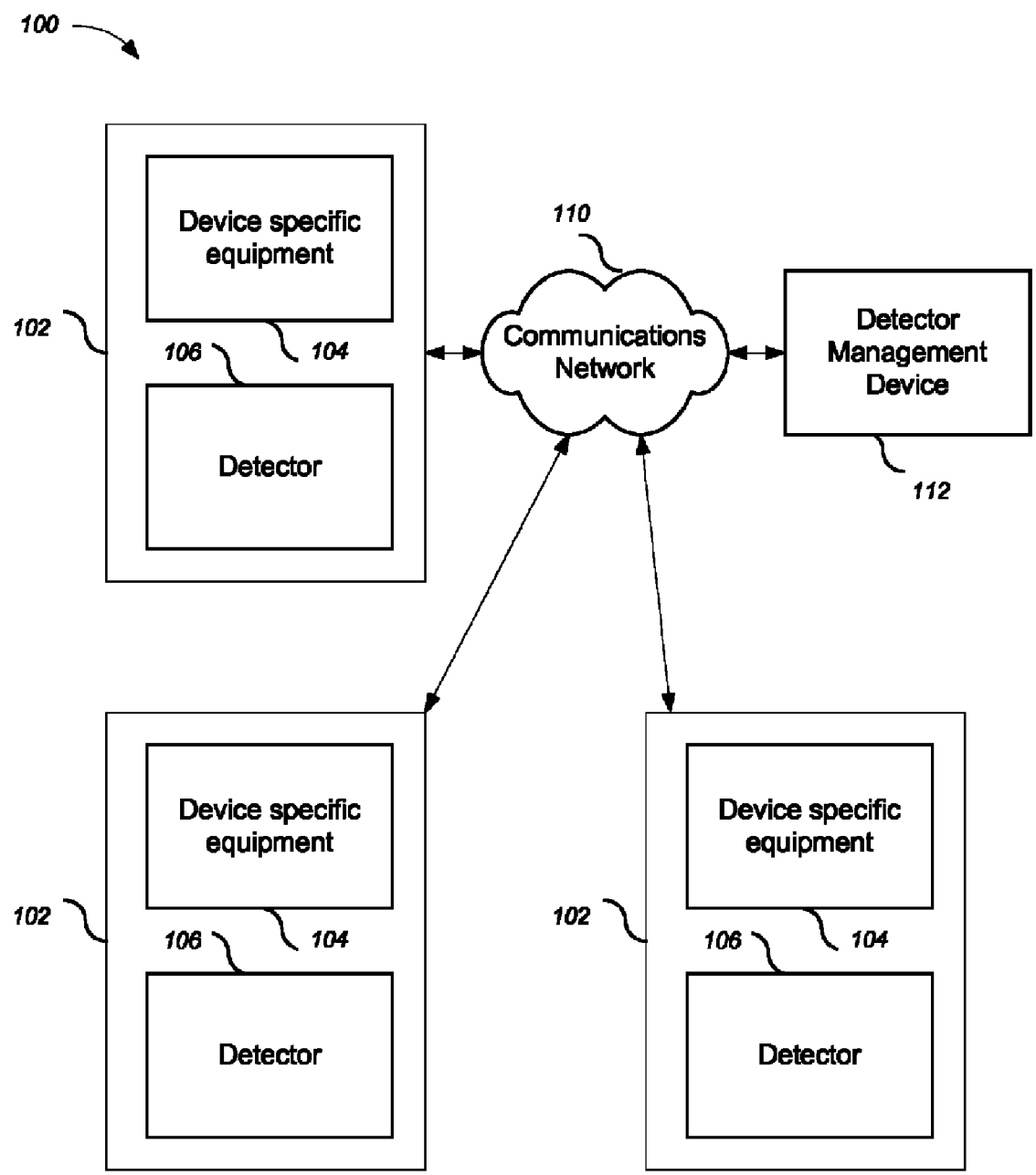
FIG. 1 shows a block diagram of an exemplary detection system.

FIG. 1 shows a block diagram of an exemplary detection system 100. The detection system 100 includes host devices 102, communications network 110, and detector management device 112. The host devices 102 are linked to the detector management device 112 using the communications network 110.

The communications network 110 can include one or more different communications networks allowing data to pass in one or more directions between each host device 102 and the detector management device 112. The communications network 110 can include wired communications networks such as a public switched telephone network ("PSTN") or broadband network (e.g., Ethernet, cable). The communications network 110 can also include wireless communication networks including cellular, microwave, radio frequency, and other wireless systems. The communications network 110 can be a public network, private network, or a combination of both.

The detector management device 112 provides management functions for the host devices 102. The detector management device 112 can receive data from the host devices 102. For example, the detector management device 112 can receive alerts from the host devices 102 if an event is detected. The detector management device 112 can determine a response to the received alert. Additionally, the detector management device 112 can coordinate the operation of a detector, in response to, or independent of, a received alert. In one implementation, the detector management device 112 communicates with each individual host device 102 to manage the particular operation of a detector housed within the host device 102, which can vary in accordance with specific conditions.

The host devices 102 include detectors 106 and device specific equipment 104. Each detector 106 provides detection of one or more types of events. For example, detector 106 can provide one or more of radiation, biological, or chemical detection. Additionally, or alternatively, detector 106 can monitor other environmental conditions including meteorological (e.g., temperature, pressure, wind), and audiovisual (e.g., surveillance systems, biometric imaging).

In one implementation, each host device 102 can be a device commonly found in public locations, for example, building hallways, streets, and transportation terminals (e.g., bus, train, subway, and airport). Host devices 102 can provide a public structure configurable to connect with the communications network 110. The host devices 102 can be the same type of device or can include a variety of different device types. In one implementation, existing devices can be retrofitted to become host devices including one or more detectors (e.g., using a conversion kit to install one or more detectors in the device).

The host devices 102 include, or can be adapted to include, components operable to provide particular functionality. For example, the host devices 102 can include connectivity components. Connectivity components connect the host devices 102 to one or more communication networks 110. The connectivity components can provide the host devices 102 with IP connectivity (e.g., using ISDN, xDSL, Cable, T-1, 802.11 wireless, etc.). Wired connectivity can include copper wiring as well as fiber optic cables. Connectivity components can also include wireless connectivity to a communication network including radio frequency ("RF") microwave, cellular, or other wireless communications systems. The host devices 102 can include two or more different connectivity components to provide multiple and redundant connectivity.

Each host device 102 can also include power components. Power components provide electrical power for operating components of each host device 102. Power components can include connections to external power sources such as AC or DC line connections. Additionally, power can be supplied using internal power components, for example, from one or more batteries, fuel cells, solar panel, or other source. Host devices 102 can include more than one power component to provide a primary and redundant power supply.

Each host device 102 can include other components. For example, the host devices 102 can include software or hardware (e.g., an application specific integrated circuit) providing logic for performing one or more functions. A display component can be included to provide interaction with a user. Electrical surge protection components can be included to provide protection from electrical surges both in-line and externally generated (e.g., lightning). Additionally, the host device 102 can include components to provide lighting for the host device 102. Furthermore, the host device 102 can be weatherized for outdoor use as well as provide concealment for the detector 106.

In one implementation, each host device 102 includes device specific equipment 104 having one or more primary functions other than to provide environmental detection and/or monitoring. Device specific equipment 104 can include the connectivity, power, and other components described above. Alternatively, one or more of the components can be provided as part of the detector 106 and incorporated into the host device 102 (e.g., by retrofitting an existing device). The host device 102 can be, for example, a pay telephone, an ATM machine, a security device, public kiosk, traffic signal, or any other device, the function of which incorporates a connection to a communications network 110.

For example, a pay telephone includes equipment for placing a circuit switched telephone call through a PSTN. An ATM machine includes equipment (e.g., a modem) for communicating data through the PSTN associated with monetary transactions including, for example, account information, amounts withdrawn and amounts deposited. A security device (e.g., an alarm system) communicates alarm signals through a PSTN or other communications network. For example, when the security device detects a breach (e.g., a broken window), a signal can be transmitted by the security device, using the communications network, to communicate an alert. The ATM and security device, for example, do not provide public communications in contrast with the pay telephone functionality. Other host devices can also be designed for use with some form of network connection. For example, modern traffic lights can include data communication connections for providing traffic management.

In an alternative implementation, the device specific equipment 104 can function without any preexisting communications network connection, such that connection can be added to the host device 102 to provide a connection for the data communication for the detector 106 through communications network 110. For example, in one implementation, the detector 106 can be incorporated into a vending machine to create a detection system 100 when coupled to a communications network 110. Additional equipment can be added to provide the communications network 110 connection for the detector 106.

Figure 2:
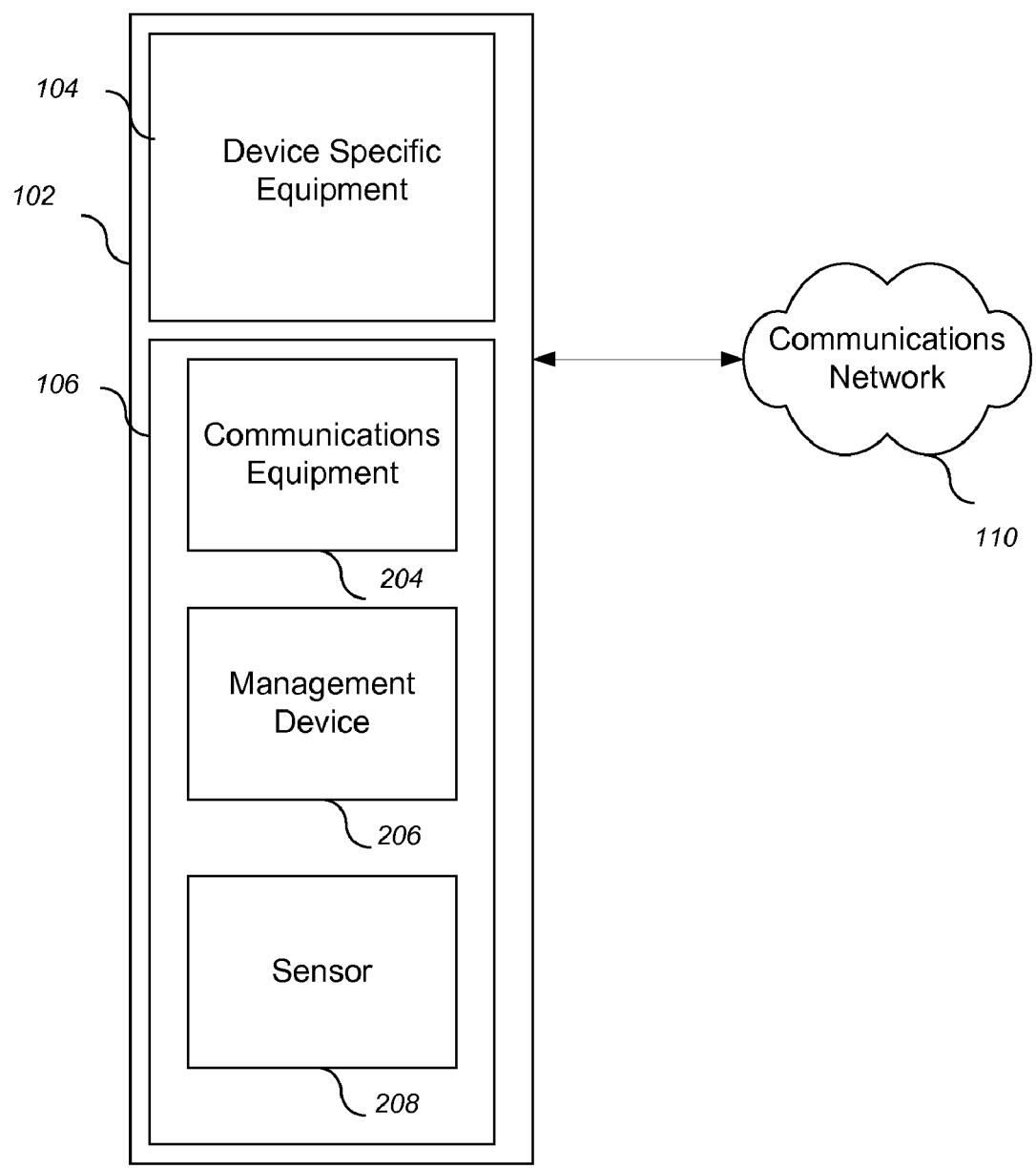
FIG. 2 shows a block diagram of an example detector.

FIG. 2 shows a block diagram of an example host device 102 coupled to communications network 110. The host device 102 includes device specific equipment 104 and the detector 106. The device specific equipment 104 controls operation of the primary functions of the host device 102 separate, and independent, from the detector 106. For example, in an ATM machine, the device specific equipment 104 can include hardware and/or software providing the ATM functionality. Additionally, for devices having preexisting connections to communications networks, the device specific equipment can include equipment for connecting with the communications network (e.g., telephone equipment for connecting the ATM to the PSTN).

The detector 106 includes communications equipment 204, a management device 206, and a sensor 208. The communications equipment 204 allows the detector 106 to transmit data across the communication network 110 to the detector management device 112. For example, the communications equipment 204 can receive data from the management device 206 and process the data for transmission over the communications network 110.

The communications equipment can also allow the detector 106 to receive data from the detector management device 112 through the communication network 110. For example, the communications equipment 204 can process incoming data from the communications network 110 and route the data to the management device 206. In one implementation, the communications equipment 204 includes equipment for connecting to a wired network including a PSTN or a broadband data network. In another implementation, the communications equipment includes wireless equipment such as a transmitter and receiver for sending and receiving data to the communication network 110.

In one implementation, the communications equipment 204 includes a splitter/filter module to provide simultaneous connectivity for both the detector 106 and any preexisting communications equipment in the device specific equipment 104. For example, communications equipment from the device specific equipment 104 (e.g., telephone equipment of a pay telephone device) can connect to the communications network 110 such as a PSTN using the splitter/filter module. The splitter/filter module can be configured to separately maintain incoming and outgoing communications signals from both the device specific equipment 104 and the communications equipment 204. Consequently, the device specific equipment 104 and the communications equipment 204 can operate independently. Additionally, in another implementation, the splitter/filter module can provide interference filtering for signals passing through the splitter/filter module to or from the communications network 110.

The management device 206 manages operation of the sensor 208 and provides sensor data to the detector management device 112. In one implementation, the management device 206 processes data from the sensor 208 to determine whether or not an event has occurred. In an alternative implementation, the management device 206 performs some initial processing, which is then relayed to the detector management device 112 for further processing. For example, images recorded by the detector 106 can be transmitted to the detector management device for biometric imaging (e.g., facial recognition processing). In one implementation, the management device 206 sends data to the detector management device continuously or periodically according to a schedule regardless of whether an event has been detected. The management device 206 can also receive instructions from the detector management device 112 through the communications network 110. The received instructions can include instructions to perform particular operations with the sensor 208 as well as instructions for initiating an alarm or other alert operation.

The sensor 208 includes measuring or sampling equipment for monitoring and/or detecting events. The sensor 208 can be configured to monitor one or more different environmental conditions. For example, the sensor 208 can monitor air for biological and chemical contaminants, detect radioactive particles, as well as measure atmospheric or meteorological conditions. Additionally, the sensor 208 can be configured to provide audio and video monitoring including biometric imaging. The range of the sensor 208 can vary depending, for example, on the type of sensor and the location of the detector. For example, in one implementation a detector can be positioned near a roadway. The sensor 208 can be configured to have a range capable of detecting events among nearby people as well as more distant automobiles passing on the street.

In one implementation, the sensor 208 detects events by collecting air samples. The collected air samples can then be analyzed to identify the composition of the air sample. In one implementation, the sensor includes a mass spectrometer or other device for identifying particular chemical and biological agents. Other types of analysis can be performed to analyze the composition of the air samples. The air samples can be collected periodically according to a predefined schedule or, alternatively, can be continuously sampled.

In another implementation, the sensor 208 detects radioactive particles. For example, the sensor 208 can include a radiation detector such as a Geiger counter. The Geiger counter records a count of the number of detected radioactive particles per unit time. Count totals can be sent to the management device 206 continuously or periodically. In one implementation, the count totals over a particular period of time are sent to the management device 206. In another implementation, count totals are only sent to the management device 206 if a particular count threshold is reached (e.g., the count total exceeds the background radiation level by a particular amount). In one implementation, the sensor 208, alone, or in combination with the management device 206, can determine the type of radiation detected as well as strength of the radiation. In another implementation, information associated with the particles detected by the sensor 208 can be used to identify the type of material releasing the radiation.

Additionally, the sensor 208 can also measure environmental conditions such as temperature, wind velocity, and pressure. The sensor 208 can provide continuous readings or can take periodic samples, which are transmitted to the management device 206. Audio and video recording sensors can record continuously or on-demand through commands received from the management device 206. In one implementation, for biometric imaging, the sensor 208 can record video data and transmit the data to the management device 206 for processing such as feature detection for facial recognition. Alternatively, the recorded images gathered by the sensor 208 can be transmitted to the detector management device 112 for biometric processing.

Figure 3:
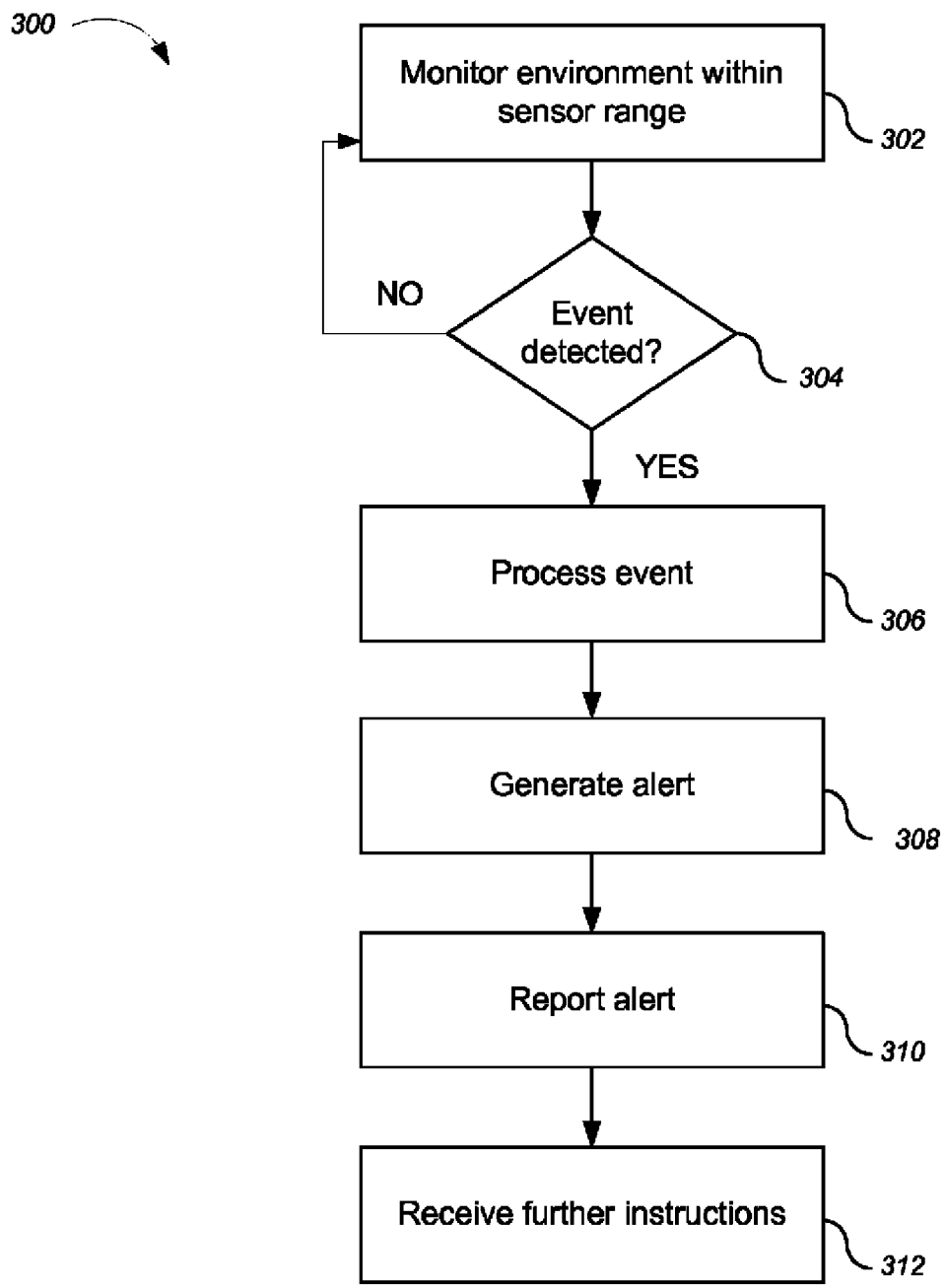
FIG. 3 shows an example detection process.

FIG. 3 shows an example detection process 300. A detector (e.g., detector 106) housed within a device (e.g., host device 102) monitors within the range of a sensor (e.g., sensor 208) (step 302). The monitoring of the detector can be independent of the functions of the host device (e.g., by device specific equipment 104). For example, the detector operation can be independent from operations of a host ATM. The sensor range can depend on the type of sensor, the type of sensing process (e.g., air sampling) as well as the strength of the detected event source (e.g., stronger radiation sources can be detected from a greater distance). The monitoring can be continuous monitoring or periodic monitoring according to a predefined schedule. For example, the detector can monitor at particular times during the day (e.g., during "rush hour") or periodically at a particular rate (e.g., once an hour).

In one implementation, the monitoring schedule can be set and adjusted by the detector management device (e.g., detector management device 112). The detector can also provide on-demand monitoring according to instructions from the management device (e.g., management device 206) or from the detector management device.

During the monitoring process, a determination is made as to whether an event has occurred (step 304). For example, if a monitored environmental condition exceeds a predetermined threshold value an event can be triggered. If no event has occurred, the detector continues monitoring. If an event has occurred, the event is processed (step 306). The event is processed, for example, by the management device. Processing can include verifying the sensor results. In one implementation, an initial reading by the sensor can require subsequent processing, for example, taking another sample from the sensor and comparing the results in order to verify the alert.

In one implementation, a chemical or biological sensor can have a low initial threshold level for triggering a possible event, but further processing can be required in order to eliminate false positive results. In another implementation, for biometric imaging, an initial facial recognition match, for example, can require additional image processing to confirm the match.

If the event processing verifies the event, an alert is generated (step 308). The generated alert can then be reported to the detector management device (step 310). In some implementations, an alarm is generated in addition to the reporting action. For example, if a detected environmental agent (e.g., radiation, chemical, biological) exceeds some predetermined maximum threshold level, an alarm can automatically be generated. In other implementations, the detector continues monitoring and waits for instructions from the detector management device.

The detector can receive further instructions from the detector management device (step 312). The instructions can include, for example, generating an alarm, logging the event, taking a new measurement for comparison, or other action. Generating an alarm can include emitting an audible siren or alert message audible within a particular range of the device. The instructions can also include a request for additional data associated with the detected event. For example, the instructions can request video or audio data corresponding to the time surrounding the detected event.

Figure 4:
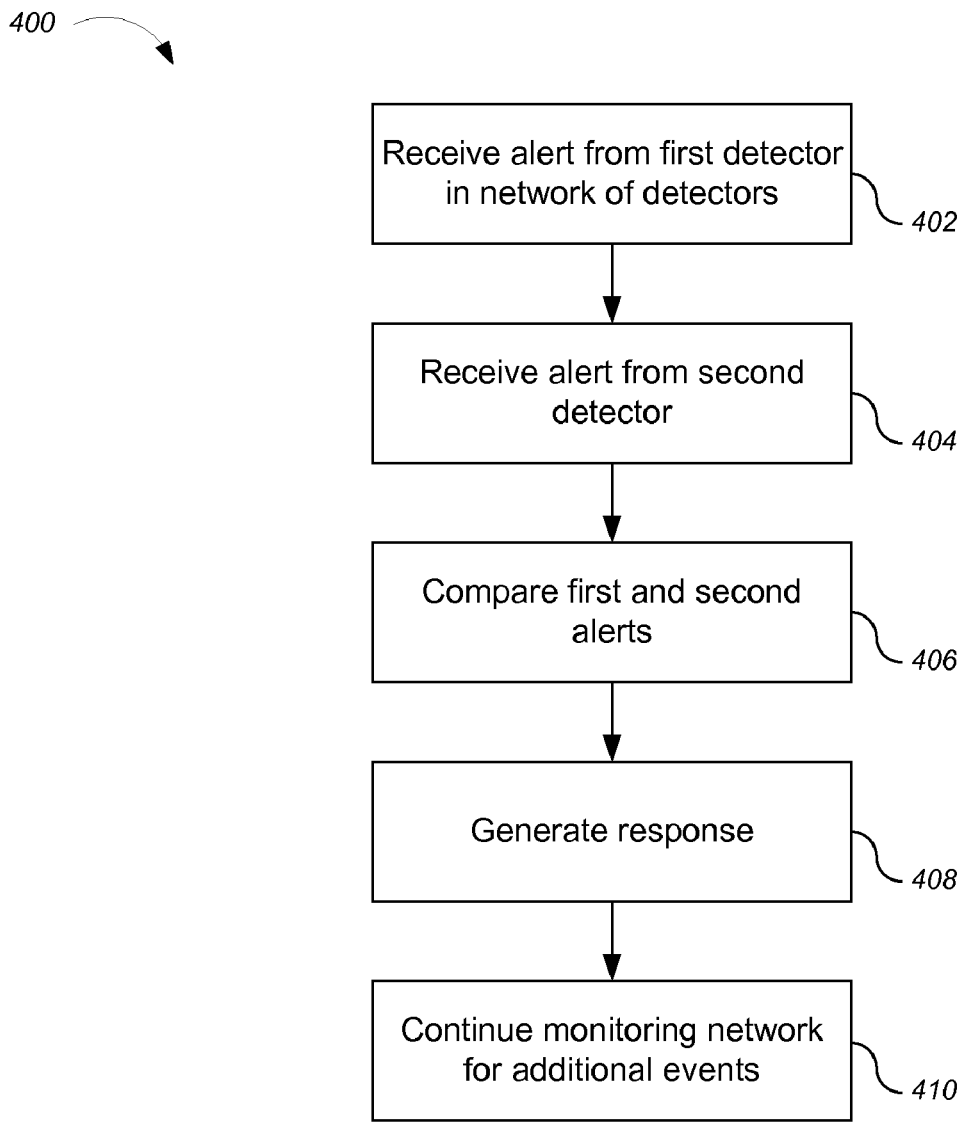
FIG. 4 shows an example process for tracking an event.

In one implementation, the detector management device can be used to identify and track detected events across a network of detectors in the detection system. For example, the detectors can be positioned throughout a city (e.g., within host devices) where they can passively detect events passing within range of the individual detectors and report the detected events to the detector management device. FIG. 4 shows an example process 400 for tracking events using a detection system having a network of detectors.

The detector management device can receive an alert from a first detector in the network of detectors (step 402). For example the first detector can detect a threshold amount of radioactive particles and transmit an alert to the detector management device. The detector management device can log the alert as well as provide particular instructions to the alerting detector. For example, the detector management device can provide instructions to the detector to take additional readings to verify the previous alert or instructions to change the rate of measurements (e.g., increase periodic measuring rate).

Additionally, the detector management device can instruct the alerting detector not to produce an alarm in order to surreptitiously track the event source. In one implementation, the detector management device can also provide instructions to nearby detectors in the detection system, for example, to place the detectors in a heightened state for use in tracking the event source. The heightened state can include increasing sensor activity (e.g., increasing the sampling/detection rate) of the detectors, focusing the detector to a particular environmental agent (e.g., radioactive particle detection), and activating video and/or audio monitoring equipment.

The detector management device can receive an alert from a second detector in the network of detectors (step 404). The detector management device can compare the type of alert from the second detector with the alert from the first detector (step 406). If the type of alert from the second detector is different from the type of alert from the first detector, the alert from the second detector can be processed independently and in a similar manner as the alert from the first detector.

However, if the type of alert received from the second detector is the same as the alert received from the first detector (i.e., a radiation alert), then additional processing can be performed (step 408). In one implementation, the additional processing can be performed to determine the relationship between the alerts. For example, the spatial relationship between the first and second detectors is determined. Thus, for detectors in the network positioned in devices throughout an urban area, for example, the detector management device can track the motion of a substance generating the alert in the respective detectors using the location of the alerting detectors. Furthermore, the time interval between the alerts can indicate the mode of transportation of the substance causing the alert. For example, a short time period relative to the distance between the alerting detectors indicates that the event source is located within a vehicle. The detector management device continues to monitor the network for additional events (step 410).

In one implementation, corresponding video from the detectors for a time period surrounding the alert can be compared for both alerting detectors to identify common features such as suspect individuals or vehicles. This information can be appropriately reported (e.g., provided to law enforcement agencies). Additionally, possible locations of the substance can be estimated by the detector management device based on the direction of travel and rate of motion. Other detectors in the network along the possible travel routes can be placed on a heightened state.

Figure 5:
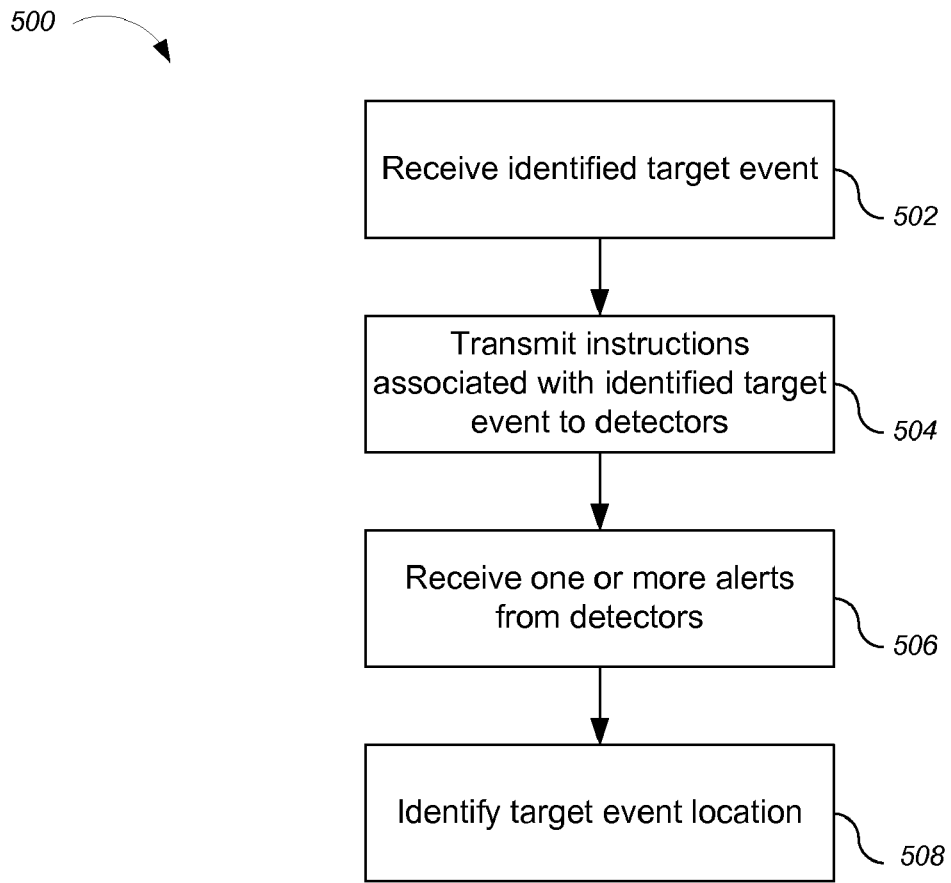
FIG. 5 shows an example process for searching for a target event.

In another implementation, the network of detectors can receive instructions from the detector management device to actively search for a particular target event. FIG. 5 shows an example process 500 for active detection. The detector management device receives an identified target event (step 502). For example, the identified target event can be supplied by a user input. For example, the target event can be an individual (e.g., to detect using biometric imaging) or a suspected environmental agent being transported through the region covered by the detection system.

The detector management device transmits instructions associated with the identified target event to detectors in the network of detectors (step 504). The detector management device can transmit to all the detectors or to a subset of the detectors in the network of detectors. The instructions can include instructions to actively search for the identified target event. For example, the identified target event can be a biometric imaging target, such as a particular individual of interest. In another implementation, the instructions can place the detectors in a heightened state, as discussed above, focused on the identified target event.

The detector management device can receive one or more alerts from the detectors indicating that the identified target event has been detected (step 506). The detector management device can identify the location of the identified target event using the known positions of the detectors (step 508). Additionally, the detection management device can continue to track the target event and/or notify law enforcement.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A detector for deployment at an existing host device, the existing host device having a connectivity component and device specific equipment with functionality that is not related to the detector, the detector comprising:
   a sensor for use in detecting an occurrence of an event;
   a management device coupled to the sensor and configured for managing operation of the sensor;
   communications equipment coupled to the management device and configured for communicating information related to the occurrence of the event to a detector management device via one or more communications networks; and
   a splitter module for providing simultaneous connectivity for the detector and the device specific equipment over the connectivity component of the existing host device.

2. The detector of claim 1, wherein sensor is a radiation sensor.

3. The detector of claim 1, wherein the sensor is a biological sensor.

4. The detector of claim 1, wherein the sensor is a chemical sensor.

5. The detector of claim 1, wherein the sensor is an imaging sensor, and wherein the detector is configured to transmit images to the detector management device for biometric imaging.

6. The detector of claim 1, wherein the sensor is a meteorological sensor.

7. The detector of claim 1, wherein the existing host device is an automatic teller machine (ATM).

8. The detector of claim 1, wherein the existing host device is a pay telephone.

9. The detector of claim 1, wherein the sensor is a video recorder.

10. The detector of claim 1, wherein operation of the detector is controlled by the detector management device.

11. The detector of claim 1, wherein the management device is further configured for processing data from the sensor, wherein the information related to the occurrence of the event includes the processed data from the sensor.

12. The detector of claim 11, wherein the management device is further configured for receiving instructions from the detector management device, the instructions being for using in processing data from the sensor.

13. The detector of claim 11, wherein the management device is further configured for determining whether the event has occurred.

14. The detector of claim 13, wherein the detector is configured for transmitting alerts related to detected event occurrences to the detector management device.

15. The detector of claim 1, wherein the connectivity component includes copper wiring.

16. The detector of claim 1, wherein the connectivity component provides Internet protocol connectivity.

17. The detector of claim 1, wherein the detector is powered by a power component included in the connectivity component.

* * * * *